US009322944B2

(12) United States Patent
van Borselen et al.

(10) Patent No.: US 9,322,944 B2
(45) Date of Patent: Apr. 26, 2016

(54) WAVEFIELD REGULARIZATION BY 3-D WAVEFIELD DECOMPOSITION FOR GEOPHYSICAL DATA

(71) Applicant: PGS Geophysical AS, Lysaker (NO)

(72) Inventors: Roald G. van Borselen, Voorschoten (NL); Robertus F. Hegge, Rijswijk (NL)

(73) Assignee: PGS Geophysical AS, Oslo (NO)

( * ) Notice: Subject to any disclaimer, the term of this patent is extended or adjusted under 35 U.S.C. 154(b) by 459 days.

(21) Appl. No.: 13/900,207

(22) Filed: May 22, 2013

(65) Prior Publication Data
US 2014/0278114 A1    Sep. 18, 2014

Related U.S. Application Data

(60) Provisional application No. 61/790,069, filed on Mar. 15, 2013.

(51) Int. Cl.
*G01V 1/30*    (2006.01)
*G01V 1/32*    (2006.01)

(52) U.S. Cl.
CPC ............... *G01V 1/307* (2013.01); *G01V 1/325* (2013.01); *G01V 2210/57* (2013.01)

(58) Field of Classification Search
CPC .................................................... G01V 1/307
USPC .......................................................... 702/14
See application file for complete search history.

(56) References Cited

U.S. PATENT DOCUMENTS

| 4,570,246 | A  | * | 2/1986  | Herkenhoff ............ G01V 1/306 367/62 |
| 6,747,913 | B2 |   | 6/2004  | Fokkema et al. |
| 7,035,737 | B2 |   | 4/2006  | Ren |
| 7,039,525 | B2 |   | 5/2006  | Mitter |
| 7,123,543 | B2 |   | 10/2006 | Vaage et al. |
| 7,286,690 | B2 |   | 10/2007 | Kelly |
| 7,336,561 | B2 |   | 2/2008  | Borresen |
| 7,359,283 | B2 |   | 4/2008  | Vaage et al. |
| 7,426,438 | B1 | * | 9/2008  | Robertsson ............ G06Q 30/06 702/14 |
| 7,505,361 | B2 |   | 3/2009  | Sollner |
| 7,616,523 | B1 |   | 11/2009 | Tabti et al. |
| 7,646,672 | B2 |   | 1/2010  | Kluver |

(Continued)

FOREIGN PATENT DOCUMENTS

EP    2 177 933 A2    4/2010

OTHER PUBLICATIONS

J.T. Fokkema, et al "Seismic Applications of Acoustic Reciprocity", Chapters 10 and 11, 1993, 34 pages, Delft University of Technology, Delft, The Netherlands.

(Continued)

*Primary Examiner* — Bryan Bui (57) ABSTRACT

One embodiment relates to a method of wavefield regularization for geophysical data acquisition of seismic geophysical data. Measured traces, are obtained from an array of sensors. For each grid point on a processing grid, best-fitting traces of the measured traces are found. Using the best-fitting traces, spectral amplitudes of down-going and up-going wavefields are computed. The down-going and up-going wavefields are subsequently transformed to an output grid in a space-time domain. Another embodiment relates to an apparatus for wavefield regularization of geophysical data acquisition. Other embodiments, aspects and features are also disclosed.

16 Claims, 5 Drawing Sheets

(56) References Cited

U.S. PATENT DOCUMENTS

| | | |
|---|---|---|
| 7,684,281 B2 | 3/2010 | Vaage et al. |
| 7,768,869 B2 | 8/2010 | van den Berg et al. |
| 7,835,225 B2 | 11/2010 | Sollner et al. |
| 7,872,942 B2 | 1/2011 | Sollner |
| 7,929,373 B2 | 4/2011 | Barr, Jr. |
| 7,957,906 B2 | 6/2011 | Turnbull |
| 7,986,586 B2 | 7/2011 | van Borselen et al. |
| 8,089,825 B2 | 1/2012 | Barr, Jr. et al. |
| 8,126,652 B2 * | 2/2012 | Aaron ............... G01V 1/36 702/14 |
| 8,174,926 B2 | 5/2012 | Kluver |
| 8,239,135 B2 | 8/2012 | Day et al. |
| 8,274,858 B2 | 9/2012 | Riyanti et al. |
| 8,300,498 B2 | 10/2012 | Hegge et al. |
| 8,339,896 B2 | 12/2012 | van Borselen et al. |
| 8,345,510 B2 | 1/2013 | Hegna et al. |
| 2006/0133202 A1 | 6/2006 | Tenghamn |
| 2010/0091610 A1 * | 4/2010 | Sollner ............... G01V 1/38 367/24 |
| 2010/0097886 A1 | 4/2010 | Day et al. |
| 2011/0134718 A1 | 6/2011 | van Borselen et al. |
| 2011/0178715 A1 | 7/2011 | Aaron et al. |
| 2011/0242937 A1 | 10/2011 | Sollner et al. |
| 2012/0033526 A1 | 2/2012 | Hegna et al. |
| 2012/0039149 A1 | 2/2012 | van Borselen et al. |
| 2012/0259553 A1 | 10/2012 | Parkes et al. |

OTHER PUBLICATIONS

Ewoud Jan Van Dedem, "3D surface-related multiple prediction", Chapter 4, 2002, 32 pages, Delft University of Technology, Delft, The Netherlands.

The extended European Search Report for EP Application No. 14 158 634.7, dated Jan. 5, 2016, 7 sheets.

* cited by examiner

WAVEFIELD REGULARIZATION BY 3-D WAVEFIELD DECOMPOSITION FOR GEOPHYSICAL DATA

CROSS-REFERENCE TO RELATED APPLICATIONS

This application claims the benefit of Provisional Application No. 61/790,069, filed Mar. 15, 2013, the disclosure of which is hereby incorporated by reference.

BACKGROUND OF THE INVENTION

In seismic exploration, seismic data may be acquired by imparting acoustic energy into the Earth near its surface, and detecting acoustic energy that is reflected from boundaries between different layers of a subsurface rock formation. Acoustic energy is reflected when there is a difference in acoustic impedance between adjacent layers to a boundary. Signals representing the detected acoustic energy are interpreted to infer structures and composition of the subsurface rock formation structures, thereby to aid in the identification and production of hydrocarbons.

In marine seismic exploration, a seismic energy source, such as an air gun, or air gun array, marine vibrator, or marine vibrator array, is typically used to impart the acoustic energy into the formations below the bottom of the water. The source is actuated at a selected depth in the water, typically while the source is being towed by a vessel. The same or a different vessel tows one or more seismic sensor cables, called streamers, in the water. Generally the streamer extends behind the vessel along the direction in which the streamer is towed. Typically, a streamer includes a plurality of receivers or sensors, such as hydrophones, for example, disposed on the cable at spaced apart, known positions along the cable. Hydrophones are sensors that generate an optical or electrical signal corresponding to the pressure of the water or the time gradient of pressure in the water. The vessel that tows the one or more streamers typically includes recording equipment to make a record, indexed with respect to time, of the signals generated by the receivers in response to the detected acoustic energy. The record of signals may be processed to infer structures of and compositions of the earth formations below the locations at which the seismic survey is performed.

BRIEF DESCRIPTION OF THE DRAWINGS

The invention and its advantages may be more easily understood by reference to the following detailed description and the attached drawings, in which.

While the invention will be described in connection with one or more embodiments, it will be understood that the invention is not limited to these. On the contrary, the invention is intended to cover all alternatives, modifications, and equivalents that may be included within the scope of the invention, as defined by the appended claims.

DETAILED DESCRIPTION

The present disclosure provides a method which advantageously combines 3-D wavefield decomposition and 3-D wavefield regularization for geophysical data that may have been sampled irregularly. The method may deal with aliasing criteria in a straightforward and automatic manner.

Figure 1:
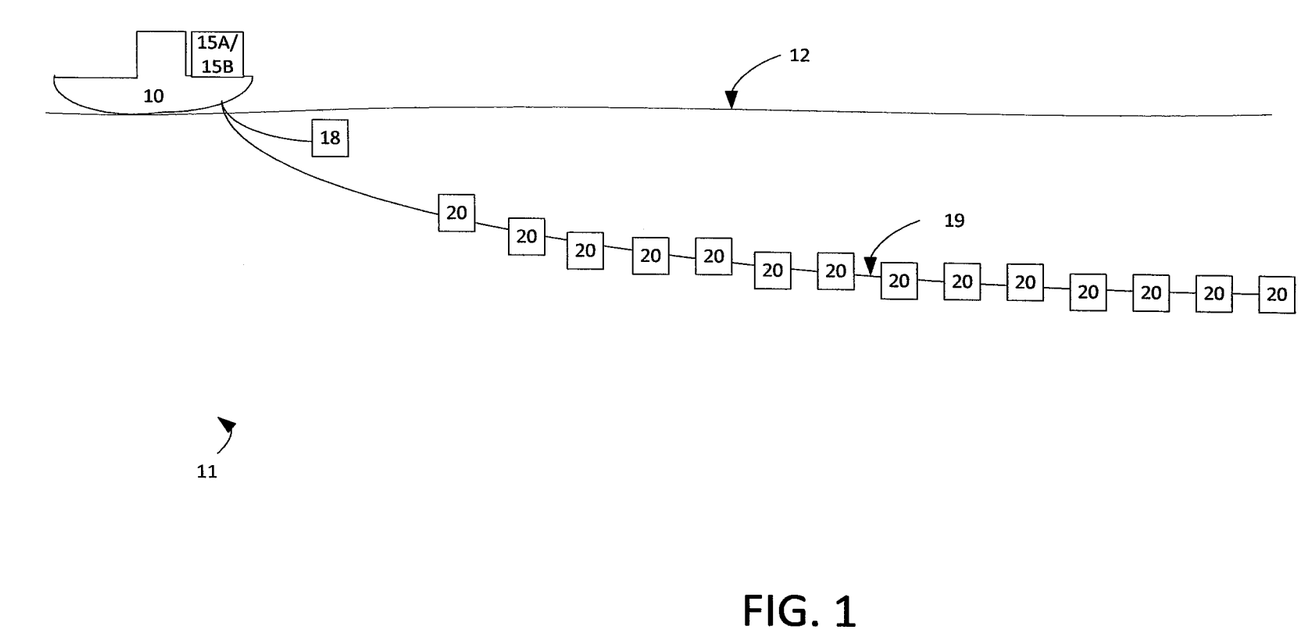
FIG. 1 shows in cross sectional view an example arrangement for geophysical data acquisition in accordance with an embodiment of the invention.

FIG. 1 shows in cross sectional view an example arrangement for geophysical data acquisition in accordance with an embodiment of the invention. A seismic survey vessel 10 moves along the surface 12 of a body of water 11 such as a lake, sea or ocean.

The vessel 10 may include a control/recording system 15A/15B. The control system 15A and the recording system 15B may be separate systems that communicate data between each other, or they may be sub-systems of an integrated system. The control system 15A may selectively actuate one or more seismic energy sub-sources of a marine seismic source 18, while the recording system 15B may record the signals generated by sensors (receivers) 20 in response to the seismic energy imparted into the water 11 and thereby into subterranean material formations (e.g., rock formations) below the water bottom. The recording system 15B may be further configured to determine and record the geodetic positions of the seismic energy source 18 and the plurality of sensors 20 at any given time.

The vessel 10 is also shown towing a seismic streamer array 19 below the surface 12 of the water 11. The streamer array may have one or more streamers displaced from each other in a lateral (approximately the cross-line) direction. Each streamer may have multiple spaced-apart sensors 20 thereon in a longitudinal (approximately in-line) direction. (FIG. 1 depicts one streamer of the streamer array 19.)

In an exemplary embodiment, the sensors 20 may be multi-component sensors which sense pressure, three-dimensional (3-D) particle motion, and/or both pressure and particle motion. The 3-D particle motion may be sensed using tri-axial micro electromechanical accelerometers, for example. Measurement data from the sensors 20 may be sent to, or obtained by, the recording system 15B.

In accordance with an embodiment of the invention, a geophysical data product may be produced. The geophysical data product may include geophysical data processed using the technique disclosed herein and stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

Figure 2:
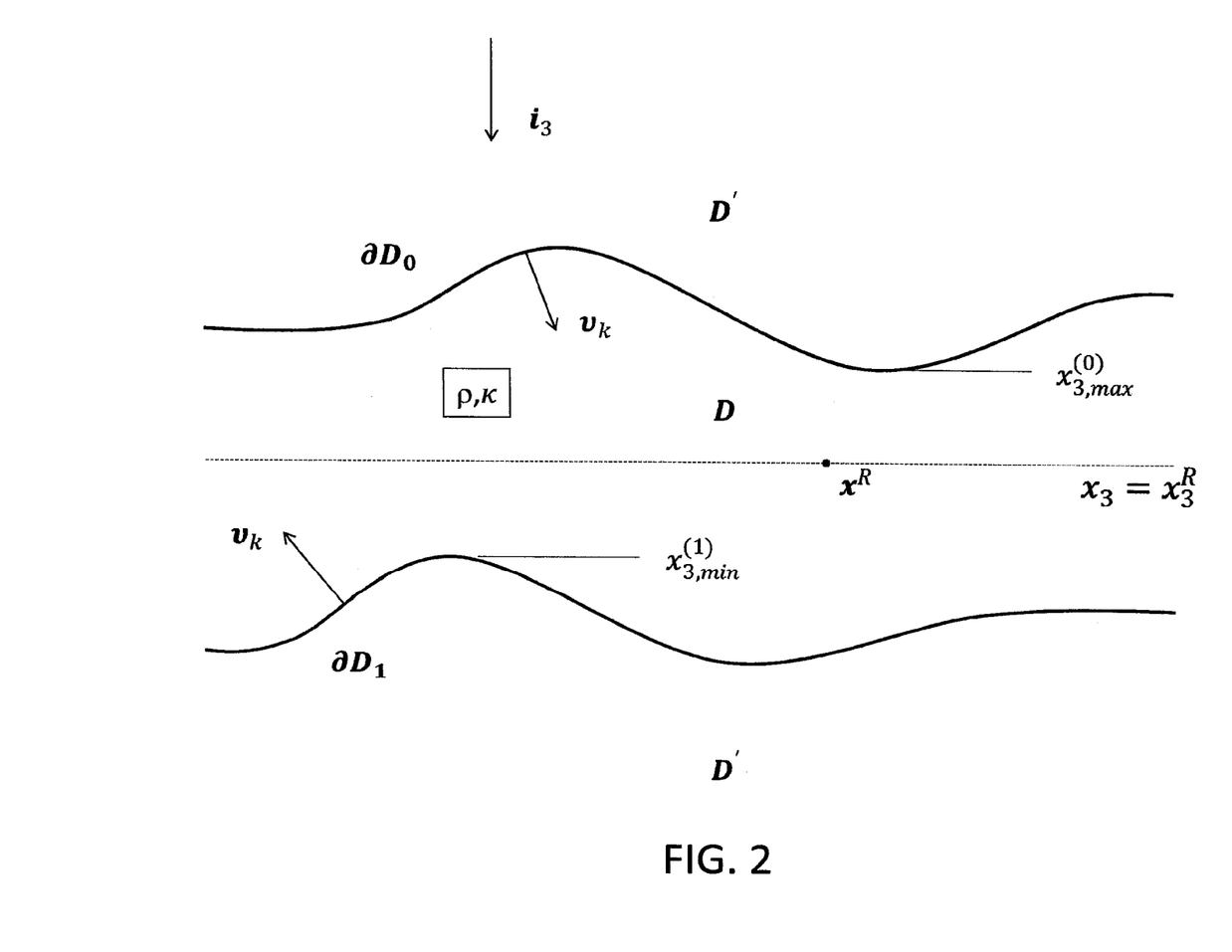
FIG. 2 depicts a homogeneous subdomain bounded by two surface interfaces in accordance with an embodiment of the invention.

FIG. 2 depicts a homogeneous subdomain bounded by two surface interfaces in accordance with an embodiment of the invention. Per FIG. 2, consider the two surface interfaces $\partial D_0$ and $\partial D_1$, and assume that the medium in the domain D between these interfaces is homogeneous with constitutive parameters $\rho$ and $\kappa$ for its density and compressibility, respectively. The spatial Cartesian coordinate system that is used may have dimensions denoted $x_1$, $x_2$ and $x_3$, where $x_1$ is the horizontal axis in the in-line direction, $x_2$ is the horizontal axis in the cross-line direction, and $x_3$ is the vertical axis indicating depth.

Further, assume that the interfaces $\partial D_0$ and $\partial D_1$ do not overlap. In other words, as shown in FIG. 2, the maximum value of the depth on the upper interface $\partial D_0$, denoted $x_{3,max}^{(0)}$, is less than (i.e. shallower than) the minimum value of the depth on the lower interface $\partial D_1$, denoted $x_{3,min}^{(1)}$. Given this assumption, there always exists a horizontal plane at $x_3 = x_3^R$ such that $x_{3,max}^{(0)} < x_3^R < x_{3,min}^{(1)}$.

While two surfaces $\partial D_0$ and $\partial D_1$ to derive the above solution, our data acquisition needs to only record the data on a single surface. Hence, consider for geophysical data acquisition, that the interface $\partial D_1$ represents the surface defined by the sensors of the streamer array 19.

Given the above, consider the pressure wavefield $\hat{p}$ at the horizontal plane $x_3 = x_3^R$. As shown by Equation (1) below, the pressure wavefield may be separated into a down-going component $\hat{p}^{down}$ and an up-going component $\hat{p}^{up}$.

$$\hat{p}(x_1, x_2, x_3^R, s) = \hat{p}^{down}(x_1, x_2, x_3^R, s) + \hat{p}^{up}(x_1, x_2, x_3^R, s), \quad (1)$$

where the complex Laplace parameter $s = j\omega$. The spectral counterparts (i.e. Fourier transforms), $\overline{p}^{down}$ and $\overline{p}^{up}$, of the down-going and up-going wavefield components, $\hat{p}^{down}$ and $\hat{p}^{up}$, are given by $$\overline{p}^{down}(js\alpha_1, js\alpha_2, x_3^R, s) = \overline{p}^{down}(js\alpha_1, js\alpha_2, s) \exp(-s\Gamma x_3^R), \quad (2)$$

$$\overline{p}^{up}(js\alpha_1, js\alpha_2, x_3^R, s) = \overline{p}^{up}(js\alpha_1, js\alpha_2, s) \exp(s\Gamma x_3^R). \quad (3)$$

In the above Equations (2) and (3), $js\alpha_1$ is the in-line spectral Fourier parameter, $js\alpha_2$ is the cross-line spectral Fourier parameter, and $s\Gamma$ is the vertical propagation coefficient.

Applicants note that both the amplitude $\overline{p}^{down}$ of the down-going wavefield component and the amplitude $\overline{p}^{up}$ of the up-going wavefield can be considered as consisting of contributions of surface source at the lower surface interface $\partial D_1$ only. These amplitudes may be expressed by $$\overline{p}^{down}(js\alpha_1, js\alpha_2, s) = \quad (4)$$
$$\frac{-1}{2s\Gamma} \int_{x \in \partial D_1} [\hat{v}_k(x,s) s\rho \exp(js\alpha_1 x_1 + js\alpha_2 x_2 + s\Gamma x_3) +$$
$$\hat{p}(x,s) \partial_k \exp(js\alpha_1 x_1 + js\alpha_2 x_2 + s\Gamma x_3)] v_k dA,$$

and $$\overline{p}^{up}(js\alpha_1, js\alpha_2, s) = \quad (5)$$
$$\frac{1}{2s\Gamma} \int_{x \in \partial D_1} [\hat{v}_k(x,s) s\rho \exp(js\alpha_1 x_1 + js\alpha_2 x_2 - s\Gamma x_3) +$$
$$\hat{p}(x,s) \partial_k \exp(js\alpha_1 x_1 + js\alpha_2 x_2 - s\Gamma x_3)] v_k dA.$$

In the above Equations (4) and (5), the particle velocity vector wavefield is given by $\hat{v}_k$, and the integrals are taken over the areas of the lower surface interface $\partial D_1$.

For completeness, the spatial Fourier transform pair $\{F, F^{-1}\}$ of function $\hat{u}$ is defined as follows.

$$F\{\hat{u}(x_1, x_2, x_3, s)\} = \overline{u}(js\alpha_1, js\alpha_2, x_3, s) =$$
$$\int_{(x_1, x_2) \in R^2} \exp(js\alpha_1 x_1 + js\alpha_2 x_2) \hat{u}(x_1, x_2, x_3, s) dA, \quad (6)$$

$$\int_{(s\alpha_1, s\alpha_2) \in R^2} \exp(-js\alpha_1 x_1 - js\alpha_2 x_2) \overline{u}(js\alpha_1, js\alpha_2, x_3, s) dA = \hat{u}(x_1, x_2, x_3, s) = F^{-1}\{\overline{u}(js\alpha_1, js\alpha_2, x_3, s)\}, \quad (7)$$

in which $\{\alpha_1, \alpha_2\}$ are the horizontal components of the angular-slowness vector $\alpha$, defined in terms of its Cartesian components, $$\alpha = \alpha_1 i_1 + \alpha_2 i_2 + \alpha_3 i_3, \quad (8)$$

where $\alpha$ may be complex, but $s\alpha$ is always taken to be real. Here, $u = u(x,t)$ represents the scalar wavefield and $\hat{u} = \hat{u}(x,s)$ denotes its time Laplace transform.

Referring back to Equations (4) and (5), the spectral amplitudes may be computed using these equations. As can be seen from Equation (4), the spectral amplitude for the down-going wavefield may be obtained through a mixed-domain operator, where an integral is computed over the acquisition surface $dA$, which lies on the upper surface $\partial D_0$. Similarly, as can be seen from Equation (5), the spectral amplitude for the up-going wavefield may be obtained through a mixed-domain operator, where an integral is computed over the acquisition surface $dA$, which lies on the lower surface $\partial D_1$.

For the spectral amplitudes to be free of spatial aliasing effects, the measured wavefields $\hat{v}_k(x,s)$ and $\hat{p}(x,s)$ need to be known or found at a sufficiently dense grid. In conventional acquisition, the sampling of these wavefields is often sufficiently dense in the direction parallel to the sail line (in-line) direction, e.g. in the direction of vector $i_1$, where $$x = x_1 i_1 + x_2 i_2 + x_3 i_3. \quad (9)$$

However, on the same surface of acquisition $\partial D_1$, in the cross-line direction perpendicular to $i_1$, i.e. in direction $i_2$, the measurements are often available only on a much coarser grid. In other words, not all pairs of traces needed are readily available from a marine seismic data acquisition.

The present disclosure provides 3-D wavefield decomposition solution using the spectral amplitude expressions for the up-going and down-going wavefields in the above Equations (4) and (5). In accordance with an embodiment of the invention, the amplitudes are computed in the spectral domain for all horizontal spectral coefficients. These spectral wavefields may then be transformed back to the space-time domain, to any output grid of preference using the above Equations (6) and (7). As such, 3-D regularization is also provided to any preferred output grid.

Figure 3A:
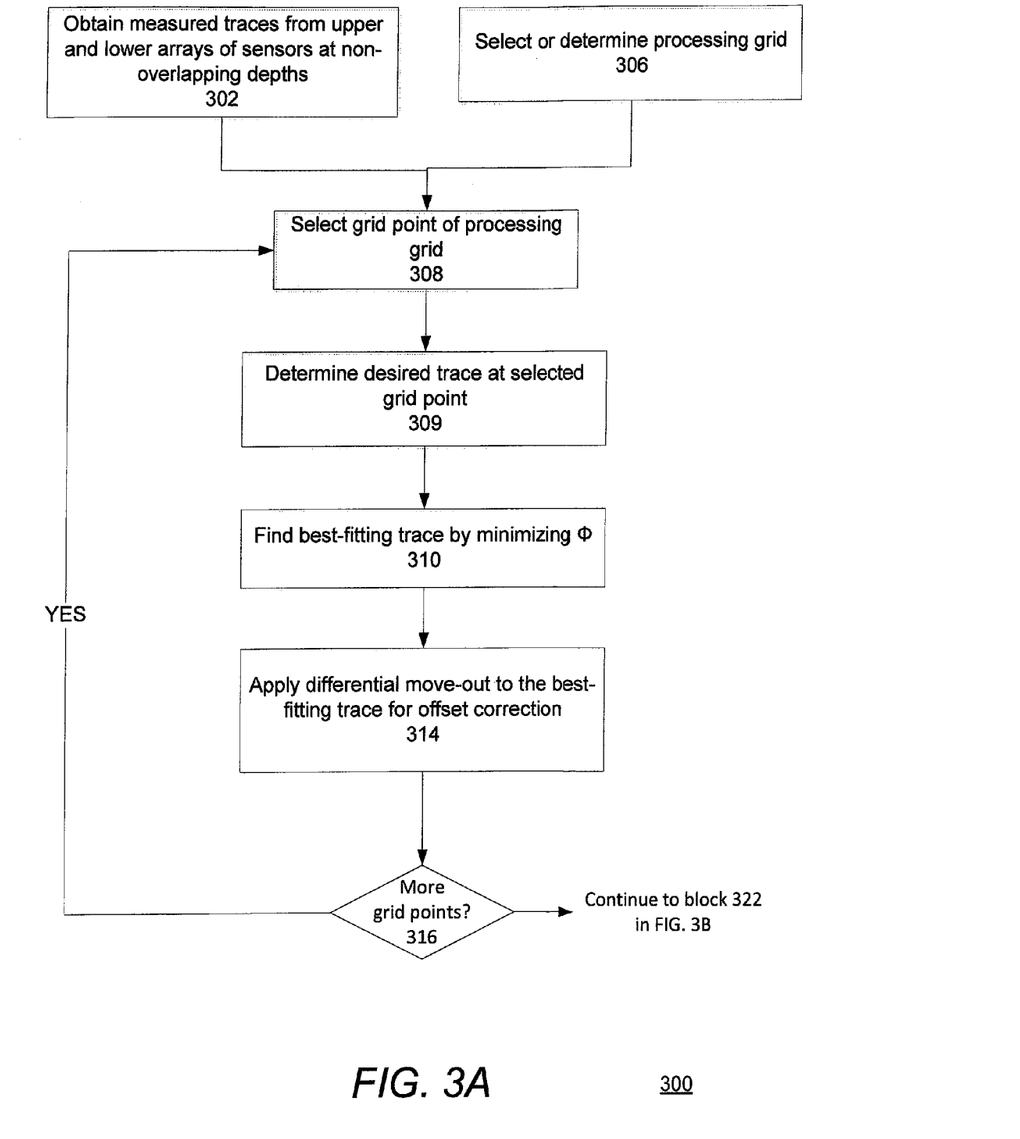
FIGS. 3A-3B provides a flow chart of an exemplary method of wavefield regularization by 3-D wavefield decomposition for geophysical data acquisition in accordance with an embodiment of the invention.
Figure 3B:
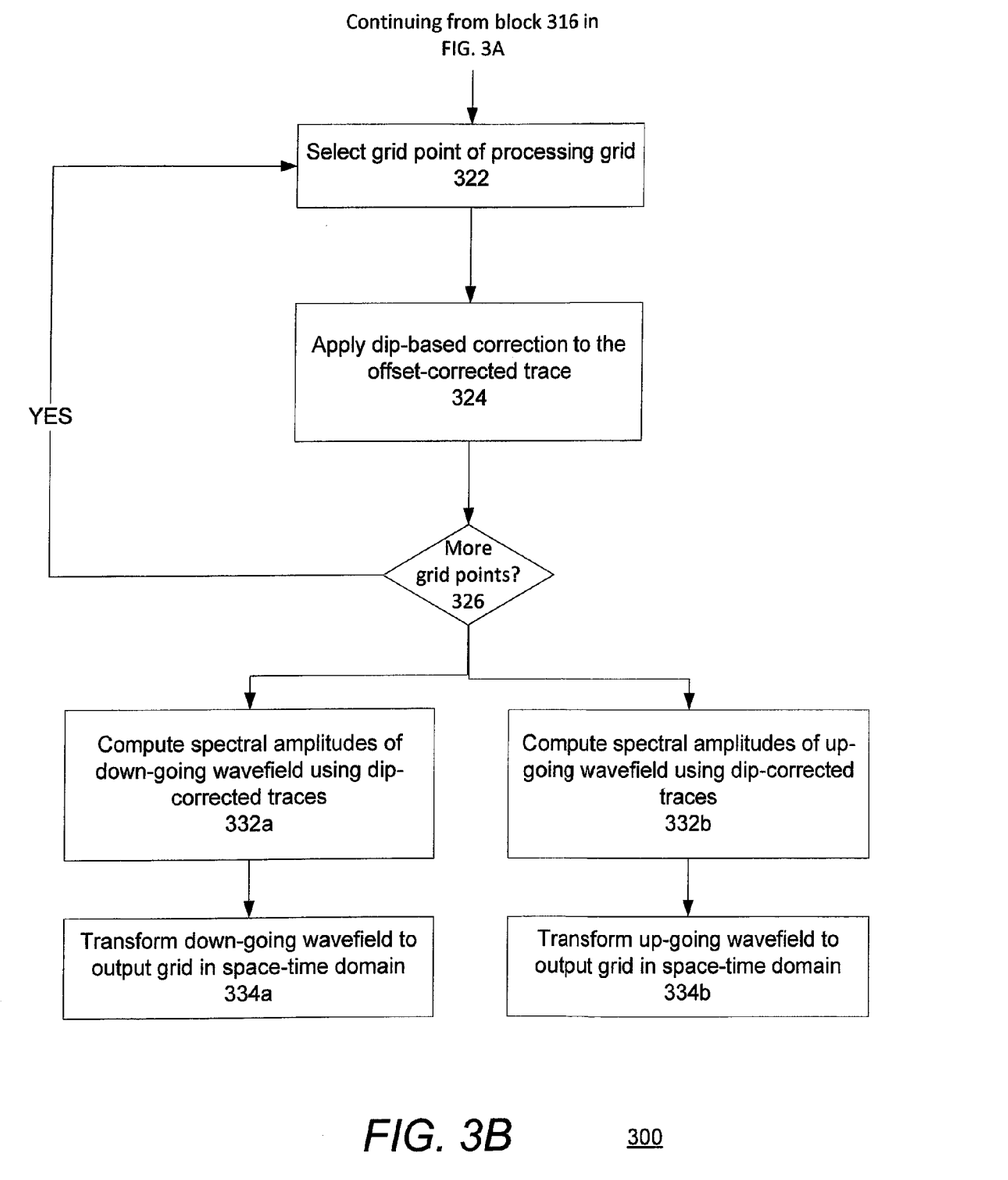

FIGS. 3A-3B provides a flow chart of an exemplary method 300 of wavefield regularization by 3-D wavefield decomposition for geophysical data acquisition in accordance with an embodiment of the invention. The geophysical data acquisition may be performed, for example, using an arrangement such as described above in relation to FIG. 1. The data processing steps in the method 300 of FIGS. 3A-3B may be performed, for example, using a computer system at a data processing facility.

Per block 302, measured traces of seismic data may be obtained from an arrays of sensors. For example, the array of sensors 19 depicted in FIG. 1 may be used to obtain the seismic data.

In one embodiment, the seismic data may be expressed in terms of values for $x^{CMP}$, $y^{CMP}$, h, $\phi$ and t, where the acquired seismic data is transformed to this format, if necessary. Here, CMP (Common Mid-Point) defines the x and y positions of the location mid-way between the source and receiver locations for the trace and will be referred to as the CMP coordinates. Furthermore, x and y are orthogonal coordinates in a processing grid, typically oriented so that x is in the inline direction and y is in the cross-line direction of the seismic survey (i.e. x corresponds to $x_1$ and y corresponds to $x_2$), although this orientation can be user-defined. Azimuth, $\phi$, may be defined as the angle between the direction of data acquisition (typically, the sail line or in-line direction in marine data acquisition) and the straight line between the source and receiver locations. The offset, h, may be defined as the total distance between the source and receiver locations for the individual trace. The arrival time, t, may be defined as the time an event is recorded on the trace.

Per block 306, a spatial processing (input) grid $R^2$ may be selected or determined. In an exemplary embodiment, the spatial processing grid $R^2$ need not be "regular". In other words, the input grid does not have to have grid points spaced evenly at periodic intervals along the $x_1$ and $x_2$ directions in a horizontal plane. Rather, the input grid may be a user-specified semi-regular grid. In accordance with an embodiment of the invention, the density of the grid points is selected or determined such that the input grid is sufficiently dense compared to the eventual output grid so as to avoid spatial aliasing.

Per blocks 308 through 316, processing is performed to reconstruct all traces needed in (desired for) above Equations (4) and (5) from the "best-fitting" or "nearest" traces in the acquired seismic data. As described below, the steps of blocks 308 through 316 may reconstruct the desired traces without accounting for azimuth differences.

Per block 308, a grid point of the input grid may be selected for processing. As described below, the processing for the selected grid point may include processing steps indicated in blocks 309, 310 and 314.

Per block 309, a desired trace at the selected grid point may be determined for the lower interface $\partial D_1$. The parameters $x^{CMP}$, $y^{CMP}$, h, and $\phi$ for the desired trace may be determined given the position of the selected grid point relative to the position of the source.

The desired traces with the correct CMP x and y positions, offset h, and azimuth $\phi$ are often not present in the set of acquired traces. Hence, best-fitting traces need to be found and adjusted appropriately.

Per block 310, the "best-fitting" or "nearest" trace from the seismic data measured using the array 19 may be found for the desired trace at the selected grid point. The best-fitting trace may be found by minimizing a function $\Phi$. In one embodiment, the function $\Phi$ may be expressed as $$\Phi = \alpha |x_b^{CMP} - x_d^{CMP}| + \alpha |y_b^{CMP} - y_d^{CMP}| + \beta |h_b - h_d| + \epsilon |\phi_b - \phi_d|, \quad (10)$$

where $\alpha$, $\beta$, and $\epsilon$ may be user-defined or predetermined weighting factors, and subscripts b and d denote best-fitting and desired traces, respectively.

Conventional data acquisition often aims at a distribution of sources and receivers such that one trace is available for each CMP bin and offset bin combination, where a CMP bin contains a small range of CMP x and y locations, and an offset bin contains a small range of offsets h. In this case, only one azimuth $\phi$ may be available for the given CMP bin and offset bin combination. In another case, more than one trace may be available at each CMP bin and offset bin combination, each trace having its own azimuth $\phi$.

In accordance with an embodiment of the invention, in either case discussed above (with one or multiple azimuths per bin combination), the best-fitting trace may be found using Equation (11) below.

$$\Phi = \alpha |x_b^{CMP} - x_d^{CMP}| + \alpha |y_b^{CMP} - y_d^{CMP}| + \beta |h_b - h_d|, \quad (11)$$

which differs from Equation (10) in that the final difference term in azimuth $\phi$ is missing. Using Equation (11), the best-fitting trace may be found by minimizing the difference as a weighted sum of differences in CMP x and y locations and offsets h, while ignoring azimuth $\phi$.

Per block 314a, after finding the best-fitting trace from the measured seismic data, a differential move-out may be applied to this data trace in order to correct the offset difference between the desired trace on the lower interface $\partial D_1$ and the best-fitting trace from the measured seismic data. This differential operator only corrects for offset differences; it does not correct for the difference in azimuth, the difference in CMP coordinates x and y, or for dip-dependent timing differences related to offset, between the desired trace and the best-fitting trace. After the differential move-out, the best-fitting trace may be referred to as an offset-corrected trace.

Per block 316, a determination may be made as to whether there are more grid points to process. If so, the method 300 may loop back to block 308 so as to select and process a next grid point of the input grid. If not, the method 300 may move on to block 322.

Per blocks 322 through 326, correction may be made for the azimuth differences between the desired traces and the best-fitting traces. This may be accomplished using dip-based corrections that may be determined and applied per trace and per sample for azimuth, CMP coordinates, and related offset differences. The dip-based corrections may be in accordance with the dip-based corrections for data reconstruction disclosed in U.S. Patent Application Publication No. 2011/0178715, the disclosure of which is hereby incorporated by reference.

The dip-based correction may be computed for the desired and the offset-corrected traces based on local dip information, and the corrections may then be applied to the offset-corrected traces at each sample. The local dip information relates to the local geology and is either predetermined or determined during the application of the reconstruction scheme for the locally-available data. Because the corrections are determined and then applied per trace, and per sample, the method 300 becomes computationally efficient. The dips may be determined from any appropriate subset of the total acquired data volume, such as, for example, from common offset volumes. These determinations generate a dip-estimate volume.

Note that dip refers to the slope between two adjacent races in the gather of the same seismic event. The dip may be measured as a ratio between a time difference and a space difference (analogous to dt/dx). The dip may be decomposed into two components, oriented along the x and y axes of the processing grid being used. Although a dipping event is generally meant to be non-horizontal, a horizontal event is not excluded.

Per block 322, a grid point of the input grid may be selected for dip-based correction to be applied. Per block 324, dip-based correction may then be applied to the offset-corrected trace for the selected grid point. After the dip-based correction, the best-fitting trace may be referred to as an azimuth-corrected trace.

Per block 326, a determination may be made as to whether there are more grid points to process. If so, the method 300 may loop back to block 322 so as to select a next grid point for the application of dip-based correction. If not, the method 300 may move on to blocks 332a and 332b.

Note that it is not necessarily required to compute a separate dip correction for each desired trace to be reconstructed. In an alternative embodiment, instead of computing dip corrections for each grid point in the processing grid, the dip corrections may be computed for grid points on a sparse grid that is less dense than the processing grid. Dip corrections for intermediate grid points may then be estimated by interpolating between the dip corrections on the sparse grid.

Per block 332a, the spectral amplitudes of the down-going wavefield on the lower surface $\partial D_1$ may be computed using the azimuth-corrected traces from the measured seismic data. Similarly, per block 332b, the spectral amplitudes of the up-going wavefield on the lower surface $\partial D_1$ may be computed using the azimuth-corrected traces from the measured seismic data. These computations may be performed in accordance with Equations (4) and (5), respectively.

After all the down-going spectral amplitudes have been computed per block 332a, a transformation may be performed per block 334a to transform the down-going wavefield to an output grid in space-time domain. Similarly, after all the up-going spectral amplitudes have been computed per block 332b, a transformation may be performed per block 334b to transform the up-going wavefield to the output grid in space-time domain. The output grid may be selected to be a regular grid. Aliasing may be avoided by previously defining the input grid to ensure that there are enough spectral amplitude components so that the backward transformation to the output grid may be accomplished without aliasing artifacts.

The transformations (334a and 334b) back to space-time domain may be performed using Equations (6) and (7). In particular, the spectral wavefields $\bar{p}^{down}$ and $\bar{p}^{up}$ of Equations (2) and (3) may be transformed to the spatial wavefields $\bar{p}^{down}$ and $\bar{p}^{up}$, respectively, using Equation (7). As a result, regularized decomposed pressure wavefields are obtained.

Figure 4:
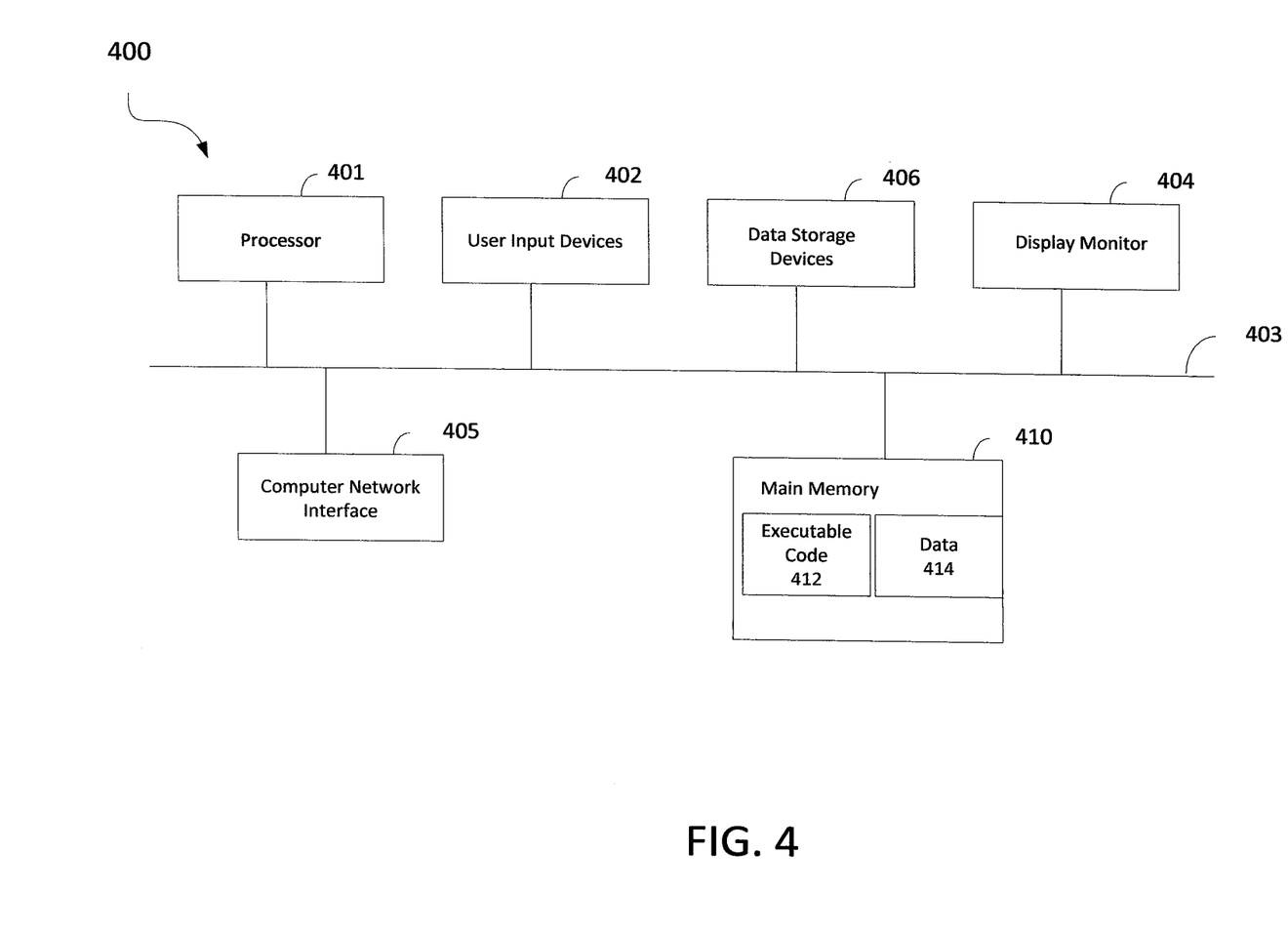
FIG. 4 shows a simplified example of a computer apparatus which may be used in performing steps of the method of FIGS. 3A-3B in accordance with an embodiment of the invention.

FIG. 4 shows a simplified example of a computer apparatus 400 which may be used in performing steps of the method 300 of FIGS. 3A-3B in accordance with an embodiment of the invention. The computer apparatus 400 may be configured with executable instructions so as to perform the data processing methods described herein. This figure shows just one example of a computer which may be used to perform the data processing methods described herein. Other types of computers may also be employed, such as multi-processor computers, server computers, cloud computing via a computer network, and so forth.

The computer apparatus 400 may include a processor 401, such as those from the Intel Corporation of Santa Clara, Calif., for example. The computer apparatus 400 may have a bus system 403 communicatively interconnecting its various components. The computer apparatus 400 may include one or more user input devices 402 (e.g., keyboard, mouse), a display monitor 404 (e.g., LCD, flat panel monitor, CRT), a computer network interface 405 (e.g., network adapter, modem), and a data storage system which may include one or more data storage devices 406 (e.g., hard drive, solid state memory, optical disk drive, USB memory) and a main memory 410 (e.g., RAM).

In the example shown in this figure, the main memory 410 includes executable code 412 and data 414 stored therein The executable code 412 may comprise computer-readable program code (i.e., software) components which may be loaded from the data storage device 406 to the main memory 410 for execution by the processor 401. In particular, the executable code 412 may be configured to perform computer-implemented steps in the methods described herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of geophysical data acquisition and processing, the method comprising:
   measuring seismic traces using a seismic source and an array of sensors to perform a seismic survey;
   determining, for each grid point on the processing grid, a desired trace on a surface which corresponds to the array of sensors;
   finding, for each grid point on a processing grid, best-fitting traces of the seismic traces, wherein finding the best-fitting traces comprises minimizing a weighted sum of differences that includes differences in common mid-point distances between the best-fitting traces and the desired traces;
   computing spectral amplitudes of down-going and up-going wavefields using the best-fitting traces;
   transforming the down-going and up-going wavefields to an output grid in a space-time domain; and
   processing said wavefields transformed to the output grid to infer structures of earth formations below locations at which the seismic survey is performed.

2. The method of claim 1, wherein the array of sensors is towed during the acquisition.

3. The method of claim 1, wherein the sensors are multi-component sensors that measure both pressure and particle velocities.

4. The method of claim 1, wherein the common mid point distances are in the in-line and cross-line directions.

5. The method of claim 4, wherein the weighted sum of differences further includes a difference in offsets between the best-fitting traces and the desired traces.

6. The method of claim 1 further comprising:
   applying differential move-outs to the best-fitting traces to obtain offset-corrected traces.

7. The method of claim 6 further comprising:
   applying dip-based correction to the offset-corrected traces to obtain azimuth-corrected traces.

8. An apparatus for acquisition and processing of geophysical data, the apparatus comprising:
   a seismic source for imparting seismic energy into subterranean material formations;
   an array of sensors for generating signals in response to the seismic energy;
   a recording system for recording the signals generated by the array of sensors; and
   a computer apparatus comprising:
      memory configured to store processor-executable code and data;
      a processor configured to execute the computer-readable code so as to modify the data;
      computer-readable code for obtaining measured traces, the measured traces including traces measured using the seismic source and the array of sensors and recorded using the recording system;
      computer-readable code for determining, for each grid point on a processing grid, a desired trace on a surface which corresponds to the array of sensors;
      computer-readable code for finding, for each grid point on the processing grid, best-fitting traces of the measured traces;
      computer-readable code for computing spectral amplitudes of down-going and up-going wavefields using the best-fitting traces, wherein finding the best-fitting traces comprises minimizing a weighted sum of differences that includes differences in common midpoint distances between the best-fitting traces and the desired traces; and
      computer-readable code for transforming the down-going and up-going wavefields to an output grid in a space-time domain.

9. The apparatus of claim 8, wherein the array of sensors comprise multi-component sensors that measure pressure and particle velocities.

10. The apparatus of claim 8, wherein the common mid point distances are in the in-line and cross-line directions.

11. The apparatus of claim 10, wherein the weighted sum of differences further includes a difference in offsets.

12. The apparatus of claim 8 further comprising:
   computer-readable code for applying differential move-outs to the best-fitting traces to obtain offset-corrected traces.

13. The apparatus of claim 12 further comprising:
computer-readable code for applying dip-based correction to the offset-corrected traces to obtain azimuth-corrected traces.

14. A method of generating a geophysical data product, the method comprising:
obtaining seismic traces measured using a seismic source and an array of sensors;
determining, for each grid point on a processing grid, a desired trace on a surface which corresponds to the plurality of sensors;
finding, for each grid point on the processing grid, best-fitting traces of the seismic traces, wherein finding the best-fitting traces comprises minimizing a weighted sum of differences that includes differences in common mid-point distances between the best-fitting traces and the desired traces;
computing spectral amplitudes of down-going and up-going wavefields using the best-fitting traces;
transforming the down-going and up-going wavefields to an output grid in a space-time domain; and
storing said wavefields transformed to the putput grid in the geophysical data product for use in determining subsurface rock formation structures.

15. The method of claim 14, wherein the common mid point distances are in the in-line and cross-line directions.

16. The method of claim 15, wherein the weighted sum of differences further includes a difference in offsets.

* * * * *